United States Patent [19]
Alien et al.

[11] 3,976,827
[45] Aug. 24, 1976

[54] APPARATUS FOR EVALUATING CHARACTERISTICS OF THE IMAGES OF OBJECTS

[76] Inventors: Imant Karlovich Alien, ulitsa Raunas, 45, kv. 32; Ivan Ivanovich Avdeev, ulitsa Malines, 70, kv. 41; Yakov Aronovich Gelfandbein, ulitsa Baltezera, 5, kv. 38; Boris Nikolaevich Ershov, ulitsa Sarkandaugava, 26, kv. 183; Anatoly Vasilievich Nikonenko, ulitsa Lokomativas, 98, kv. 16; Jury Olegovich Popov, ulitsa Veidenbaumma, 24, kv. 3; Arkady Yakovlevich Khesin, ulitsa Suvorova, 16, kv. 18; Boris Albertovich Yanson, ulitsa B. Altonovas, 8, kv.1, all of Riga, U.S.S.R.

[22] Filed: Aug. 2, 1974

[21] Appl. No.: 494,276

[52] U.S. Cl............................... 178/6; 178/DIG. 36
[51] Int. Cl.².......................................... H04N 7/02
[58] Field of Search.................. 178/DIG. 36, 6, 6.8

[56] References Cited
UNITED STATES PATENTS

| | | | |
|---|---|---|---|
| 3,578,904 | 5/1971 | Dewey | 178/DIG. 36 |
| 3,740,468 | 6/1973 | Gardner | 178/DIG. 36 |
| 3,801,741 | 4/1974 | Ablett | 178/DIG. 36 |
| 3,854,822 | 12/1974 | Altman | 178/DIG. 36 |
| 3,865,493 | 2/1975 | Morton | 178/DIG. 36 |

*Primary Examiner*—Howard W. Britton
*Assistant Examiner*—Michael A. Masinick
*Attorney, Agent, or Firm*—Haseltine, Lake & Waters

[57] ABSTRACT

The disclosed apparatus for evaluation of characteristics of the images of objects consists of a delay unit connected to the output of a video signal discriminator, wherein the square pulses coming from the output of the discriminator of the video signal are delayed for a time necessary for effecting synchronous coincidence of the respective square pulses of the current and delayed lines of the raster of the scanning unit. The apparatus further includes a synchronous coincidence unit and a synchronous subtraction unit, each one of them being connected by its respective input to the output of the video signal discriminator both directly and through the delay unit. The output of the synchronous subtraction unit is connected to a gate connected to the output of the generator of quantizing pulses. The outputs of the synchronous coincidence unit and of the synchronous subtraction unit are connected to a perimeter computation unit directly, while the output of the synchronous subtraction unit is additionally connected to the perimeter computation unit through a gate.

23 Claims, 9 Drawing Figures

APPARATUS FOR EVALUATING CHARACTERISTICS OF THE IMAGES OF OBJECTS

The present invention relates to the field of identification of images, and, more particularly, it relates to television-computation arrangements designed for evaluating various characteristics of identified objects by their images, for instance, to apparatus for evaluating characteristics of the images of objects, such as perimeter, area and form factor.

Known in the art is an apparatus for evaluating characteristics of the images of objects (cf. British Patent No. 1,259,038 filed on July 31, 1969, Int.Cl. G 01 $b$ 7/32 and H 03 $k$ 13/02), comprising a scanning means effecting line-by-line and frame-by-frame scanning of the image of the object, with subsequent shaping by means of a video signal discriminator of square pulses proportional to the lengths of the chords of the image of the object, supplied simultaneously with the quantizing pulses of a quantizing pulse generator to the means for measuring geometric parameters of the image of the object, representative of the characteristics of the image of the object.

As the geometric parameters of the investigated image of the object there are employed but two characteristics, namely, the relative size of the image and an abstract form factor not taking an account of the actual proportion of the geometric dimensions of the image of the object. This is attained in the known apparatus by evaluating the investigated characteristics by means of counting the number of times the lines of a frame either touch or intersect the image of the object, the form factor, for example, being determined by scanning twice in two perpendicular directions. In the known apparatus this evaluation is effected with the help of the means for measuring the geometric parameters of the image of the object, including a system of gates, controlled by the scanning means operating in association with prisms rotatable about the optical axis of the scanning means by an electromagnetic motor.

As a result, the main disadvantage of the above described known apparatus consists in the fact that when there are evaluated the characteristics of the images of intricate objects (such as those having deep indentations, broken edges and internal cavities), the employment of the apparatus becomes inadequately effective on account of the principle of determination of the form factor, which does not provide for receiving an impression of the actual configuration of the image of the object. And this very class of intricate objects is the one most frequently encountered in solving of actual problem of analysis of microstructures in biology, medicine, metallography and elsewhere.

Besides, the necessity of repeated scanning combined with relative displacement of the image of the object and scanning means requires incorporation in the known apparatus of high-precision optical and mechanical elements, which complicates manufacture of the apparatus and increases the costs of its operation and maintenance.

It is an object of the present invention to create an apparatus for evaluating characteristics of the image of an object, providing for automatic evaluation and measurement with sufficiently high accuracy of the required characteristics, such as perimeter, area, form factor, of the image of an object, particularly, of an object of an intricate shape including deep indentations, broken edges and internal cavities.

A further object of the present invention is to create an apparatus for evaluation of characteristics of the image of an object, which should provide for selection in time and space of the measured image of the object from a combination of the images of other objects.

It is an additional object of the present invention to create an apparatus for evaluating characteristics of the image of an object, providing for selection of at least one full frame of a television sequence of frames. This might be essential in a case where it is necessary to evaluate characteristics of the image of an object changing its shape with time.

This is attained in an apparatus for evaluating characteristics of the images of objects, consisting of scanning means effecting line-by-line and frame-by-frame scanning of the image of an object, with subsequent shaping of square pulses with the help of a video signal discriminator, proportional to the lengths of the chords of the image of the object, the pulses being supplied together with quantizing pulses coming from a quantizing pulse generator to a means for measuring the geometric parameters of the image of the object, representative of the characteristics of the image of the object, in which apparatus, according to the present invention, the means for measuring the geometric parameters of the image of the object, representative of the characteristics of the image of the object, includes a delay means connected to the output of the video signal discriminator, in which delay means the square pulses coming from the output of the video signal discriminator are delayed for a time sufficient for effecting synchronous comparison of the square pulses related to the current and delayed lines of the raster of the scanning means, the apparatus further including a synchronous coincidence unit having the inputs thereof connected directly and through the delay means to the output of the video signal discriminator and effecting comparison by the number of coincidences of the fronts of the square pulses of the current and delayed lines, and a synchronous subtraction unit having the inputs thereof connected directly and through the delay means to the output of the video signal discriminator and effecting subtraction of the duration of the square pulses proportional to the lengths of the chords of the image of the object, respectively, in the current and delayed lines, the apparatus also comprising a gate connected to the output of the synchronous subtraction unit and to the output of the quantizing pulse generator so that the square pulses of which the duration is proportional to the difference of the lengths of the chords of the image of the object in the current and delayed lines, obtained by the abovesaid subtraction, are filled with quantizing pulses coming from the output of the quantizing pulse generator to the second input of the gate, and a unit for calculation of the perimeter of the image of the object, having the inputs thereof connected to the outputs of the gate, of the synchronous subtraction unit and of the synchronous coincidence unit, so that in this perimeter calculation unit the sequences of quantized square pulses proportional to the differences of the lengths of the chords of the image of the object in the current and delayed lines are used for approximation of a portion of the perimeter of the image of the object, and to the value thus obtained there is added a number of interline spaces equal to the number of the cases of coincidence of the fronts of the said square pulses proportional to the lengths of the chords of the image of the object in the synchronous coincidence unit, in which manner the complete perimeter of the image of the object is approximated.

To accomplish optimal timing of the comparison of a pair of adjacent scanning lines in the synchronous coincidence and the synchronous subtraction units, it is expedient that the delay means should include an ultrasonic delay line preset for a time equal to the duration of a single line of the scanned image.

It is quite reasonable, in order to effect synchronous subtraction of the duration of the pulses proportional to the lengths of the chords in the adjacent lines of the scanned image, that the synchronous subtraction unit should include two NOT logical elements and two AND logical elements or gates connected to the output of the video signal discriminator directly and through the delay means so that the square pulses proportional to the lengths of the chords of the image of the object should be fed directly to the first input of the first AND gate and through the second NOT gate to the first input of the second AND gate, as well as directly to the second input of the second AND gate and through the first NOT gate to the second input of the first AND gate, and also should include an OR logical element or gate of which the inputs are connected to the outputs of the AND gates, there being formed at the output of the OR gate square pulses proportional to the differences of the lengths of the chords of the image of the object in the current and delayed lines, the last-mentioned pulses being supplied to the perimeter computation unit both directly and through the aforesaid gate circuit.

It is desirable, in order to accomplish optimal timing of the discrimination of coincidences of the fronts of the square pulses in the current and delayed lines, for the synchronous coincidence unit to include two AND gates, each being associated with a pair of shapers of pulses coinciding with the fronts of the square pulses proportional to the lengths of the chords of the image of the object, of which the outputs are connected to the respective inputs of the AND gates, the inputs of the pulse shapers associated with the first AND gate being connected directly to the outputs of the video signal discriminator and of the delay means, the inputs of the pulse shapers associated with the second AND gate being connected to the last-mentioned outputs through NOT gates, and further to include an OR gate of which the inputs are connected to the outputs of the AND gates, there being shaped at the output of the OR gate pulses representative of the coincidence of the fronts of the square pulses proportional to the lengths of the chords of the image of the object in the current and delayed lines, supplied to the perimeter computation unit.

It is reasonable, to effect approximation of the image of the objects by its complete perimeter, for the perimeter computation unit to include an adder to the first input of which there are fed the pulses of coincidence from the output of the synchronous coincidence unit and to the second input of which there are fed the sequences of quantized square pulses proportional to the differences of the lengths of the chords of the image of the object in the current and delayed lines from the synchronous subtraction unit through the gate circuit and also to include a code converter of which the first input is connected to the output of the gate circuit, for this input to transmit the sequences of quantized square pulses presented in a sequential code, as well as two selectors of the fronts of square pulses proportional to the differences of the lengths of the chords of the image of the object in the current and delayed lines, one of the selectors being connected to the zero setting input of the code converter and the other selector being connected to the control input of the converter, the input of the first selector being connected to the output of the synchronous subtraction unit directly, and the input of the second selector being connected to the same output through a NOT gate, and further to include a scaling means of which the scaling factors $K_i$ are determined depending on the scanning standard, on the ratio of the frequencies of the quantizing pulse generator and line-by-line scanning and on the respective sequential number of the output of the code converter, the inputs of the translation means being connected to the outputs of the code converter and the outputs thereof being connected to the other inputs of the adder to which there are supplied pulses complementary to the sequencies of the quantized square pulses.

To effect determination of the form factor of the image of the object according to the established formula:

$$f = \frac{P^2}{S},$$

wherein $f$ is the form factor, $P$ is the perimeter of the image of the object, $S$ is the area of the image of the object, the apparatus may be provided with an additional gate circuit of which the first input is connected to the output of the video signal discriminator and the second input is connected to the output of the quantizing pulse generator and also to include an area counter of which the input is connected to the output of the additional gate circuit and wherein there is determined the total duration of the square pulses proportional to the lengths of the chords of the image of the object, which presents the area "S" of the image of the object, and further to include a form factor "$f$" determination unit of which the inputs are connected to the output of the perimeter computation unit and to the area counter so that in this "$f$" determination unit there is effected division of the squared value "P" of the perimeter by the aforementioned total duration of the square pulses, presenting the area "S" of the image of the object.

An apparatus having a structure in accordance with the present invention ensures rapid and accurate determination of the perimeter "P", area "S" and form factor "$f$" of the images of objects having an intricate structure.

The present invention will be further described in connection with embodiments thereof, with reference being had to the accompanying drawings, wherein.

Figure 1:
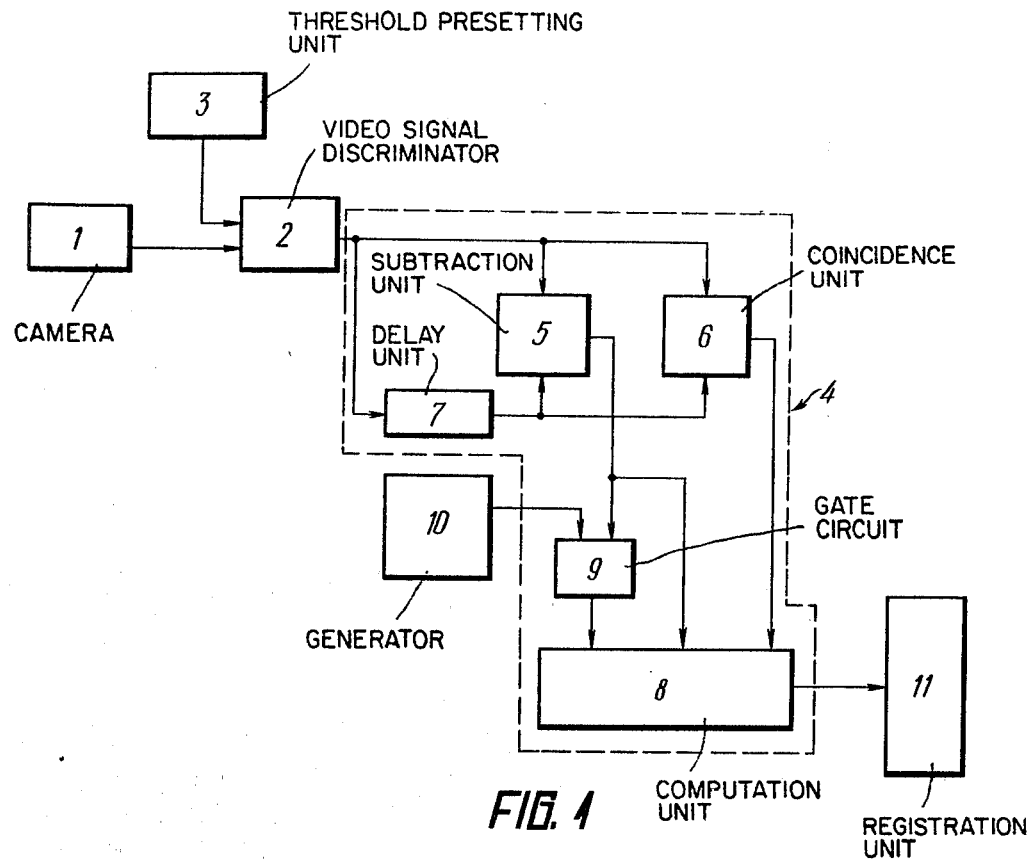
FIG. 1 is a block unit diagram of an apparatus for evaluating characteristics of the image of an object in accordance with the present invention, viz. for determination of the perimeter of the image of the object.
Figure 7:
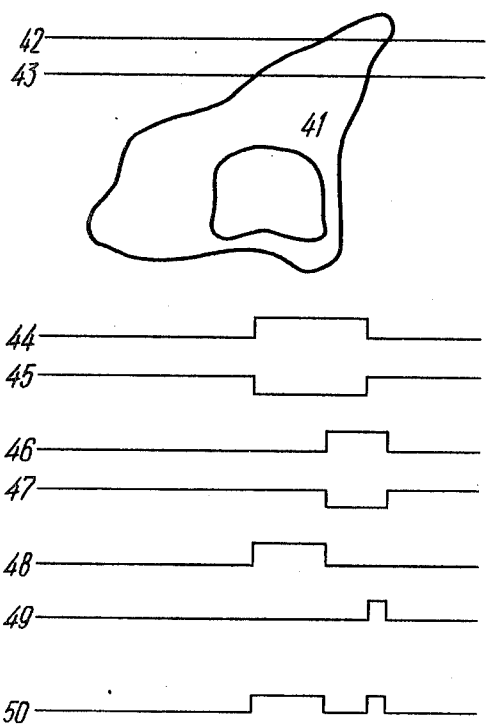
Figure 8:
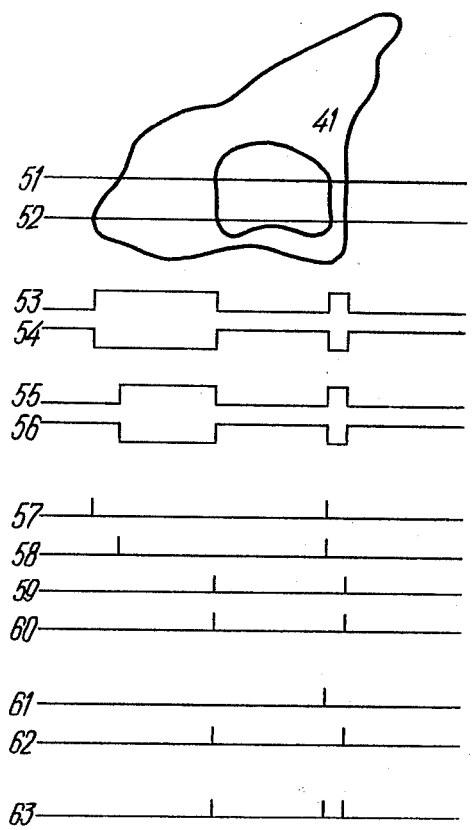
Figure 9:
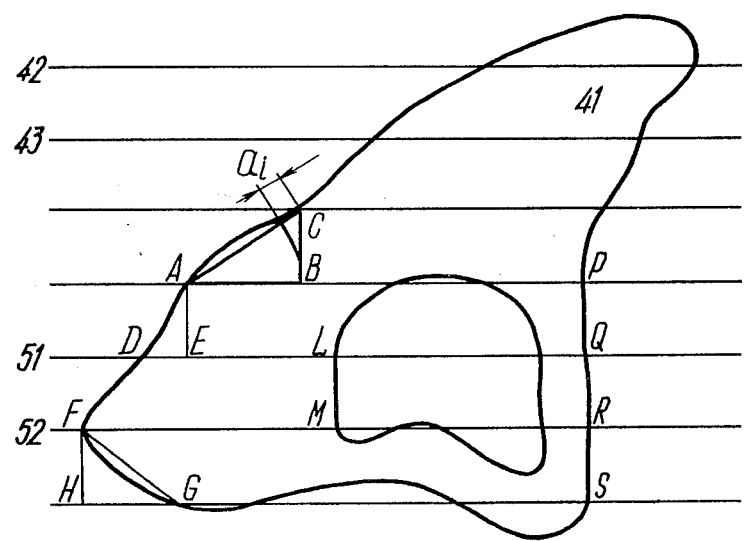

FIG. 7 presents space- and time-related diagrams illustrating the operation of the synchronous subtraction unit of the apparatus shown in FIG. 1;

FIG. 8 presents time- and space-related diagrams illustrating the operation of the synchronous coincidence unit of the apparatus shown in FIG. 1;

FIG. 9 depicts the image of an object and a portion of the approximated perimeter determined by the apparatus shown in FIG. 1.

An apparatus for evaluating characteristics of an object, according to the present invention, is designed in the presently described embodiment for measurement of the perimeter of the images of intricate objects, such as those having deep cuts and indentations, broken edges and internal cavities. The apparatus includes as its scanning means a television pick-up or camera 1 (FIG.1) capable of effecting line-by-line and frame-by-frame scanning of the image of the object. However, instead of the television pick-up 1 the scanning means may be in the form of any other similar device capable of line-by-line and frame-by-frame scanning, such as travelling light beams systems, scanning systems with mechanical scanning elements, etc. In this embodiment the television pick-up is made in the form of a widely known transmission camera incorporable in TV broadcasting systems.

At the output of the television pick-up 1 there is developed a video signal obtained by the scanning. The output of the television pick-up 1 is connected to either one of the inputs of a video signal discriminator 2 of which the other input is connected to the output of a unit 3 presetting a desired discrimination threshold. There is performed in the video signal discriminator 2 shaping of square pulses proportional to the lengths of the chords of the image of the object, by means of presetting the threshold of the amplitude of the video signal capable of "opening" the discriminator to a specified level with the help of the threshold presetting unit 3, in conformity with a predetermined gradation of the contrast of the image of the object.

In the presently described embodiment the discriminator 2 is in the form of a widely known per se differential limiting amplifier-limiter (a Schmidt trigger may also be employed). In the presently described embodiment the video signal amplitude threshold is preset by means of the threshold presetting unit 3 as a voltage level.

The thus shaped square pulses proportional to the lengths of the chords of the image of the object are supplied from the output of the video signal discriminator 2 to the input of the means 4 for measuring geometric parameters corresponding to characteristics of the image of the object. The means 4 for measuring the geometric parameters includes a synchronous subtraction unit 5 and a synchronous coincidence unit 6, the respective first inputs of these units 5 and 6 of synchronous subtraction and coincidence being connected to the output of the discriminator 2 directly, while the respective second inputs of these units 5 and 6 are connected thereto through a delay means 7. With the help of the means 7 the square pulses are delayed for a time necessary for their synchronous comparison in the current and delayed scanned lines of the raster of the scanning means. In the presently described embodiment the delay means is in the form of a widely known per se ultrasonic delay line, such as a commercially available MS-3 Line of Delay marketed by MARUBENI IIDA, Japan. Alternatively, the delay means may be in the form of various cathode-ray tubes with the long-term storage.

However, it appears that the optimal embodiment of the present invention in a case of analysis of stationary images requires employment of the delay means 7 in the form of a ultrasonic delay line delaying the said square pulses for a time equal to the duration of a single line of scanning of the image of the object.

For analysis of dynamic or movable images it is expedient to employ the delay means 7 in the form of a cathode-ray tube with the long-term storage. Thus, there are fed to the respective inputs of the synchronous subtraction and coincidence units 5 and 6 simultaneously the aforesaid square pulses relating to the current and delayed lines of the raster, coming from the output of the discriminator 2. In the synchronous subtraction unit 5 there is effected subtraction of the duration of these square pulses proportional to the lengths of the chords of the image of the object in current and delayed lines of the raster, and there are fed from the output of the synchronous subtraction unit 5 to the input of a perimeter computation unit 8 and to one of the inputs of the gate circuit 9 square pulses of which the duration is proportional to the differences between the lengths of the chords of the image of the object, obtained as a result of the above subtraction.

Within the synchronous coincidence unit 6 there is effected comparison to determine the number of coincidences of the fronts of the said square pulses of the current and delayed lines, and a signal carrying information of the quantity of the coincidences of these fronts is fed from the output of the synchronous coincidence unit 6 to the input of the perimeter computation unit 8.

The second input of the gate 9 is connected to the output of a generator 10 of quantizing pulses, generating a continuous succession of pulses of a predetermined on-off ratio.

In the gate 9 the duration of said square pulses proportional to the differences between the lengths of the chords of the image of the object is converted into a succession code fed to the input to the perimeter of the computation unit 8.

Within the perimeter computation unit 8 the successions of the quantized square pulses proportional to the differences between the lengths of the chords of the image of the object in the current and delayed lines are used for determination, with provision for the scanning scale, of a value approximating a portion of the perimeter of the image of the object. This value has added thereto a number of inter-line spaces equal to the number of the coincidences of the fronts of the said square pulses proportional to the lengths of the chords of the image of the object in the synchronous coincidence unit 6, in which way the value of the complete perimeter of the object being measured is obtained.

The obtained results are fed from the output of the perimeter computation unit 8 to the input of the registering unit 11 wherein the results of the measurement are registered. In the described embodiment the registering unit 11 is in the form of a line printer, although it may as well be in the form of a widely known per se perforating mechanism or else a magnetic storage.

Figure 2:
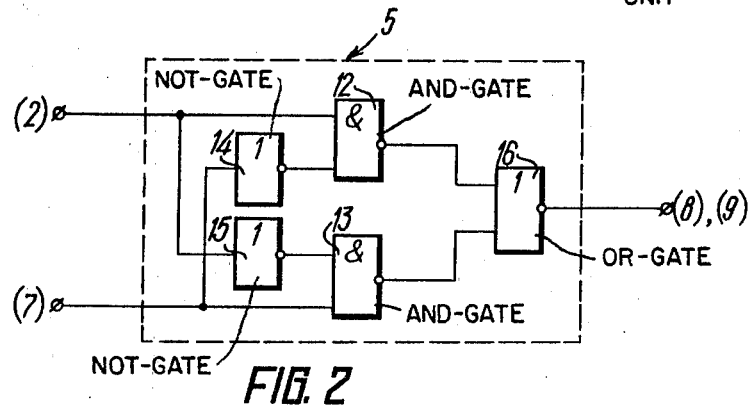
FIG. 2 is a functional diagram of the synchronous subtraction unit of the herein disclosed apparatus for evaluating characteristics of the image of an object, as presented in FIG. 1.

In the disclosed embodiment the synchronous subtraction unit 5 (FIG. 2) includes two logical elements or gates AND 12 and 13, two logical elements or gates NOT 14 and 15 and one logical element or gate OR 16, these elements being connected so that from the output of the video signal discriminator 2 the square pulses proportional to the lengths of the chords of the image of the object are fed directly to the first input of the AND gate 12 and are fed through the NOT gate 15 to the second input of the AND gate 13. Simultaneously, the corresponding square pulses delayed by the delay means 7 are fed directly to the first input of the AND gate 13 and are fed through the NOT gate 14 to the second input of the AND gate 12. The respective outputs of the AND gates 12 and 13 are connected to the inputs of the OR gate 16 which produces at the output thereof square pulses proportional to the difference between the lengths of the chords of the image of the object in the current and delayed lines, the last-mentioned pulses being fed to the perimeter computation unit 8 both directly and through the gate circuit 9.

Figure 3:
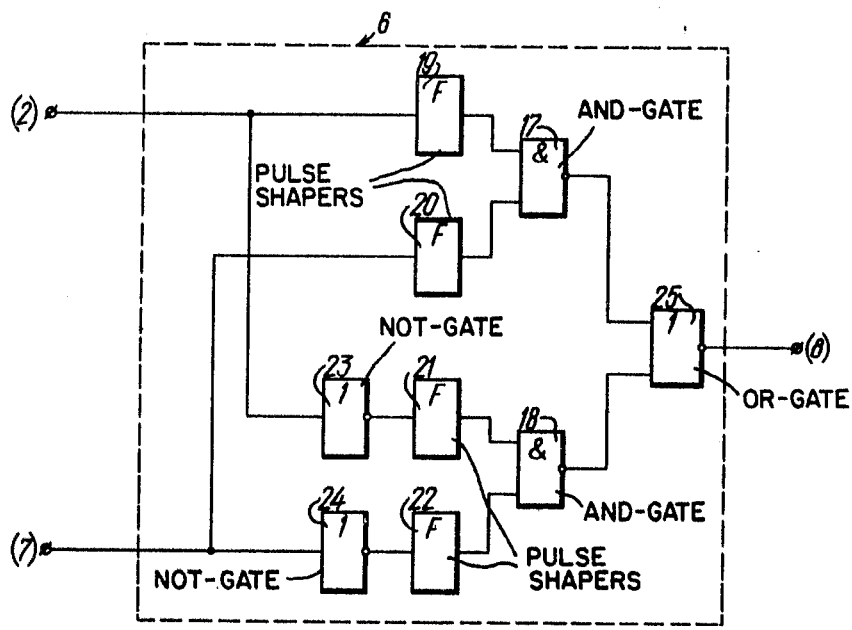
FIG. 3 is a functional diagram of the synchronous coincidence unit of the herein disclosed apparatus for evaluating characteristics of the image of an object, as presented in FIG. 1.

In the presently disclosed embodiment the synchronous coincidence unit 6 (FIG. 3) includes AND gates 17 and 18 of which the first one is connected through respective pulse shapers 19 and 20 to the outputs of the video signal discriminator 2 and of the delay means 7, while the second one is connected to the same outputs through respective similar pulse shapers 21 and 22 and NOT gates 23 and 24.

Within the abovementioned pulse shapers 19, 20, 21 and 22 there are formed pulses coinciding with the fronts of the square pulses proportional to the lengths of the chords of the image of the object in the current and delayed lines of the raster, respectively.

The outputs of the AND gates 17 and 18 are connected to the inputs of an OR gate 25 at the output of which there are thus produced pulses representing coincidence of the fronts of the said square pulses proportional to the lengths of the chords of the image of the object in the current and delayed lines, fed to the input of the perimeter computation unit 8.

Figure 4:
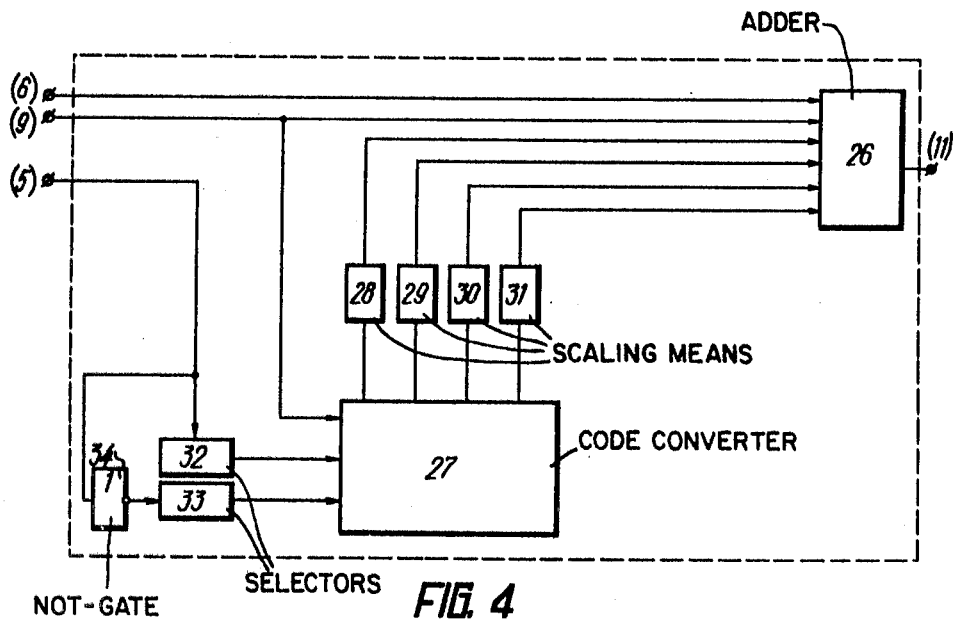
FIG. 4 is a functional diagram of the perimeter computation unit of the apparatus for evaluating characteristics of the image of an object in accordance with the invention, as presented in FIG. 1.

According to the present invention, the perimeter computation unit 8 (FIG. 4) includes an adder 26 having the first input thereof connected directly to the output of the synchronous coincidence unit 6, the second input thereof being connected to the output of the gate circuit 9, while the rest of its inputs are supplied with pulses complementary to the sequences of the quantized square pulses of the difference. To obtain these complementary pulses the perimeter computation unit 8 incorporates a code converter 27 of which the outputs are connected to scaling means 28, 29, 30 and 31 having their respective outputs connected to the inputs 3, 4, 5 and 6 of the aforementioned adder 26. Each of the scaling means 28, 29, 30 and 31 features the scaling or scaling factor $K_i$ determined according to the scanning standard, to the ratio of the respective frequencies of the aforesaid quantizing pulse generator 10 (FIG. 1) and of line-by-line scanning, as well as to the respective sequential number of the input of the code converter 27 (FIG. 4). The first input of the code converter 27 is connected to the output of the gate 9, while the zero setting input and the control input thereof are connected to the outputs of selectors 32, 33 of the fronts of the said square pulses proportional to the differences between the lengths of the chords of the image of the object in the current and delayed lines, the input of the first selector 32 being connected directly to the output of the unit 5 for synchronous subtraction, whereas the input of the second selector 33 is connected to the same output through a NOT gate 34. The output of the adder 26 is connected to the registering unit 11.

Widely known per se differential lines or circuits are employed as selectors 32 and 33 of the front of the pulses.

In another embodiment of an apparatus for evaluating characteristics of the image of an object, according to the present invention, there are computated the perimeter, the area and the form factor of the image of the object. With this task in view, the apparatus additionally includes an area counter 35 (FIG. 5) having the input thereof connected through a gate 36 to the output of the video signal discriminator 2 and to the output of the quantizing pulse generator 10. The output of the area counter 35 and the output of the perimeter computation unit 8 are connected to the respective inputs of the form factor "$f$" determination unit 37, wherein there is effected division of the squared value of the perimeter P by the value S of the area of the image, which corresponds to $$f = \frac{P^2}{S}.$$

Furthermore, the outputs of the perimeter computation unit 8 and of the area counter 35, as well as the output of the form factor determination unit 37 are connected to the inputs of the registering unit 11.

For more rapid and precise evaluation of the characteristics of the image of an object, the herein disclosed apparatus further includes means for space- and time-related selection of the image of a specified object against the background of a combination of such objects. In the presently described embodiment of the invention this means is in the form of a widely known per se electronic masking unit 38 (FIG. 6) having the respective line and frame synchronization inputs thereof connected to the respective outputs of the TV camera 1 and having the output thereof connected to one of the inputs of the coincidence circuit 39. The other input of this coincidence circuit 39 is connected to the output of the video signal discriminator 2, and the output thereof is connected both directly and through the delay means 7 to the respective inputs of the synchronous subtraction unit 5 and synchronous coincidence unit 6. The output of the said coincidence circuit 39 is also connected to one of the inputs of the gate 36.

To provide a possibility of selection of the outcome of evaluation of the characteristics of the image of an object in a single specified frame of the TV scanning sequence, the herein disclosed embodiment of the apparatus according to the invention includes a widely known per se frame selection unit 40 having its input connected to the output of the TV camera 1 and having its output connected to one of the inputs of the aforesaid coincidence circuit 39.

The operating principle of the herein disclosed apparatus for evaluating characteristics of the image of an object is, as follows.

The image of the object is converted by any suitable known scanning technique (e.g. by means of a TV camera 1 in the hereinabove embodiment) into a video signal. The said scanning means, e.g. the TV camera 1 effects in a known manner line-by-line and frame-by-frame scanning of this image. The video signal obtained at the output of the TV camera 1 is fed to one of the inputs of the video signal discriminator 2 of which the other input is connected to the output of the discrimination threshold level setting unit 3. In the video signal discriminator 2 there is effected a comparison of the video signal coming from the TV camera 1 with a permanent voltage level, i.e. with a threshold level preset by means of the threshold level setting unit 3, whereby there are produced as a result of this comparison at the output of the video signal discriminator 2 square pulses proportional to the lengths of the chords of the image, when the level of the video signal is in excess of the preset threshold level.

This threshold level is preset by the threshold level setting unit 3 in the form of a precision potentiometer.

The threshold level can be varied either continuously or stepwise in any suitable known manner within predetermined limits.

The said square pulses are fed to the respective inputs of the synchronous subtraction unit 5 and of the synchronous coincidence unit 6. To the respective first inputs of the said units 5 and 6 there are fed the square pulses proportional to the lengths of the chords of the image directly from the video signal discriminator 2, while to the respective second inputs of the same units the square pulses are fed after a delay effected by the delay means 7, equalling.

$$t_1 = m \cdot T_k \pm t_2 \quad (1)$$

wherein $t_1$ is the delay of a square pulse;

$T_k$ is the time of scanning a full frame;

$t_2$ is the time of scanning a single line;

$m$ equals 0, 1, 2, 3 ........ .

This value of the delay provides for synchronous comparison of the square pulses proportional to the lengths of the chords of the image, respectively, in the current and delayed lines of the raster.

In the embodiment being under consideration the delay means 7 incorporates an ultrasonic delay line with the delay time equalling the duration of scanning of a single line:

$t_1$ equals $t_2$, i.e. in the expression (1) "$m$" equals zero.

Thus, there are fed to the respective inputs of the synchronous subtraction unit 5 and synchronous coincidence unit 6 the said timed square pulses corresponding to the current and delayed lines of the image.

For better understanding of the mode of operation of the synchronous subtraction unit 5 let us discuss FIG. 7 of the appended drawings, depicting an image 41 being scanned, the numerals 42 and 43 referring, respectively, to the current and delayed lines of the raster. There are also represented in this FIG. 7 square pulses 44 and 45 proportional to the length of the chord of the image 41 in the current line 43, as well as square pulses 46 and 47 proportional to the length of the chord of the image 41 in the delayed line 42. The said square pulse 44 representing the current line 43, coming from the output of the video signal discriminator 2, is fed directly to the first input of the AND gate 12, whereas to the first input of the AND gate 13 there is fed the square pulse 45 from the output of the NOT gate 15.

The square pulses 46 and 47 related to the delayed line 42 are fed to the respective second inputs of these AND gates 12 and 13.

Consequently, there are produced at the outputs of the AND gates 12 and 13, respectively, square pulses 48 and 49 representing the difference between the compared lengths of the chords of the image 41.

From the outputs of the AND gates 12 and 13 the aforementioned difference-representing square pulses 48 and 49 are fed to the respective inputs of the OR gate 16 at the output of which there is formed a complete train of square pulses 50 proportional to the differences between the lengths of the compared chords of the image 41 in all the pairs of current and delayed lines of the raster.

For better understanding of the mode of operation of the synchronous coincidence unit 6 (FIG. 3) let us discuss FIG. 8 of the appended drawings depicting an image 41 being scanned, the delayed and current lines of the scanning raster indicated, respectively, with numerals 51 and 52, square pulses 53 and 54 proportional to the lengths of the corresponding chords of the image 41 in the current line 52 and square pulses 55, 56 proportional to the lengths of the chords of the image 41 in the delayed line 51.

The square pulses 53 and 55 proportional to the lengths of the chords of the image 41, respectively, in the current and delayed lines 52 and 51 are fed to the inputs of the respective NOT gates 23 and 24. Thus, there are fed to the inputs of the pulse shapers 19, 20, 21 and 22 the abovementioned square pulses 53, 54, 55 and 56. Consequently, there are formed at the outputs of the pulse shapers 19, 20, 21 and 22 pulses 57, 58, 59 and 60 coinciding with the respective fronts of the square pulses 53, 54, 55 and 56, which are sent to the AND gates 17 and 18 for comparison. If the corresponding fronts in the current line 52 and the delayed line 51 coincide, there are produced at the output of either the AND gate 17 or AND gate 18 corresponding pulses 61 or 62 representing coincidence of the fronts of the square pulses 53, 54, 55 and 56 proportional to the lengths of the chords of the image in the current line 52 and delayed line 51, these pulses being sent to the inputs of the OR gate 25. In this manner there are separated at the output of this OR gate 25 pulses 63 corresponding to the cases of coincidence of the fronts of the square pulses proportional to the lengths of the chords of the image of the object in all the successive pairs of the current and delayed lines of the scanning raster.

From the output of the synchronous coincidence unit 6 the signals are sent directly to the respective input of the perimeter calculation unit 8, while from the output of the synchronous subtraction unit 5 the signals are sent to another input of the same unit 8 both directly and through the gate 9.

In the herein disclosed embodiment of the present invention the perimeter computation unit 8 processes information coming from the synchronous subtraction and coincidence units 5 and 6 to compute the length of a broken line approximating the full perimeter of the image of the object.

The operation of the perimeter computation unit 8 (FIG. 8) is illustrated in FIG. 9 where numeral 41 indicates the image of the object and capital letters indicate some of the characteristic geometric points.

As can be seen from FIG. 9 the perimeter of the image of the object is approximated by measuring two components:

1. the sum of the hypotenuses AC, AD, . . . FG of the right-angled triangles respectively, ABC, ADE, . . . FGH, etc. wherein one cathetus equals the inter-line distance or space of the scanning raster and the other cathetus equals the difference between the lengths of the chords being compared, i.e. the horizontal projection of the inclined component of the perimeter of the image;

2. the number of the coincidences of the beginning and end points of the chords of the image of the object in any pair of the current and delayed lines of the raster, multiplied by the inter-line distance or space.

From the point of view of convenience of practical realization of the apparatus, the first component of the perimeter of the image is obtained by summation of the cathetuses AB, DE, . . . HG, etc. which are equal to the differences between the lengths of the compared chords, there being added to the sum thus obtained the sum total of the lengths $a_i$ equalling the differences between the lengths of the hypotenuses AC, AD, . . . FG, etc. corresponding to the cathetuses AB, DE, . . . HG, etc.

In accordance with the abovedescribed principle of measurement of the perimeter of the image of the object, there are fed to the first input of the adder 26 (FIG. 4) from the output of the synchronous coincidence unit 6 the pulses 63 (FIG. 8) representing the coincidence of the fronts of the square pulses 53, 55, etc. proportional to the lengths of the chords of the image in the pairs of current and delayed lines. The sum total of these pulses defines the length of the portions of the perimeter of the image, perpendicular to the lines of the scanning raster, such as the portions LM (FIG. 9), PQ, QR, RS, etc. To the second input of the adder 26 (FIG. 4) there are fed the aforementioned quantized square pulses proportional to the differences between the lengths of the chords of the image in the pairs of the current and delayed lines, corresponding to the cathetuses AB (FIG. 9), DE, . . . HG, etc. The sum total of the duration of these pulses defines the length of the horizontal component or projection of the inclined portions of the perimeter of the image of the object.

To determine the full value of the perimeter of the image of the object, it is necessary to take into account the value $a_i$ supplementing, for instance, the length of the cathetus AB to the length of the hypotenuse AC. The operation of defining the value of this complementary or supplementary length $a_i$ is performed by the code converter 27 and scaling means 28, 29, 30, 31.

The aforementioned square pulses (FIG. 7) representing the values of the differences between the lengths of the chords of the image in the pairs of the current and delayed lines are first quantized by the gate 9 (FIG. 1) and the quantizing pulse generator 10 and then fed to the input of the code converter 27 (FIG. 4) made up of a widely known per se counter and decoder (not shown). The operating mode of the code converter 27 is determined by these square pulses 50 (FIG. 7) proportional to the differences between the length of the chords of the image in the pairs of the current and delayed lines of the raster, which are fed through the pulse front selector 32 (FIG. 4) to the zero setting or of the code converter 27 and are also fed through a series connection of the NOT gate 34 and another pulse front selector 33 to the control input of the same code converter 27. The said connection of the components ensures that the converted sequential code at the output of the code converter 27 is read out by the front of the said difference square pulse 50, whereas the front of the next successive difference square pulse 50 resets the code converter 27 to zero, i.e. conditions it to measure the duration of the next successive difference pulse 50. In this manner there is effected in the code converter 27 distribution of the said quantized square difference pulses 50 by their duration, there being sent to each output of the said code converter 27 information representing the quantity of the quantized pulses of a corresponding specified duration.

To each output of the code converter 27 there is connected the respective one of the scaling means 28, 29, 30 and 31 intended to produce an addition or supplement $a_i$ to the sequential code of the quantized square pulses proportional to the differences between the lengths of the chords of the image of the object in the pairs of the current and delayed lines of the raster.

The aforementioned scaling means 28, 29, 30 and 31 are in the form of widely known per se pulse recurrence frequency dividers of which the respective division factors $k_i$ are determined by the scanning standard, the ratio of the frequencies of the said square pulse generator 10 of the quantizing pulses and of the line-by-line scanning, as well as by the respective sequential numbers of the outputs of the code converter 27, according to an expression:

$$k_i = \frac{1}{\sqrt{1 + \left(\frac{h}{b \cdot z} \cdot \frac{T_2}{T_k} \cdot n_i\right)^2 - n_i}} \quad (2)$$

wherein
  $n_i$ is the duration of the said square difference pulse 50, expressed as the quantity of the quantizing pulses, corresponding to this pulse 50;
  $T_2$ is the duration of the active part of the line of the scanning raster in microseconds;
  $T_k$ is the recurrence time of the quantizing pulses shaped by the generator 10 in microseconds;
  $z$ is the quantity of the active lines in the raster;
  $h$ and $b$ are the height and the width of the scanning raster.

As an example of the determination of the division factor let us consider the triangle ABC (FIG. 9). The said square difference pulse corresponds to the length AB representing the spacing between the beginning points of the chords of the image in the current and delayed lines of the raster, this length being proportional to the quantity of the pulses $n_i$ of the generator 10 (FIG. 1) quantizing this square difference pulse. The length BC (FIG. 9) is the inter-line space, its length being taken as the unit of measurement. To have the same measurement scale both vertically and horizontally, there is introduced a factor $k_s$ of correspondence of the frequencies of line-by-line scanning and of the quantizing generator, with provisions for the scanning scale:

$$k_x = -\frac{h}{b.z} \cdot \frac{T_2}{T_k}. \qquad (3)$$

Thus, with provisions for the scanning scale $$AB = \frac{h}{b.z} \cdot \frac{T_2}{T_k} \cdot n_i.$$

By determining in a known manner the portion of the perimeter of the image of the object $AC = \sqrt{BC^2 + AB^2}$ we can see that $$AC = \sqrt{1 + \left(\frac{1}{h} \cdot \frac{T_2.k}{T_k} \cdot n_i\right)^2}. \qquad (4)$$

Since there has been supplied to the second input of the adder 26 (FIG. 4) a number $n_i$ defining with certain accuracy the length of the horizontal projection of the length AC (FIG. 9), it is necessary to determine the value $a_i$ supplementing this horizontal projection, i.e. the length AB, to the full length AC:

$$a_i = AC - AB,$$

$$a_i = \sqrt{1 + \left(\frac{1}{h} \cdot \frac{T_2.k}{T_k} \cdot n_i\right)^2} - n_i \qquad (5)$$

The value $a_i$ is positively less than a unity, which means that to every $N_i$ square difference pulses having a duration $n_i$ there should be added into the adder 26 (FIG. 4) $N_j$ pulses that are the integral value of the supplement $a_i$, produced at the outputs of the scaling means 28, 29, 30 and 31.

The values of $k_i$ obtained from the expression (2) are rounded up with an accuracy that is adequate for practical reasons to the nearest integer.

The pulses from the outputs of the scaling means 28, 29, 30 and 31 are sent to other inputs of the adder 26 where they are added to the already obtained length of the broken line approximating the portion of the perimeter of the image of the object.

Figure 5:
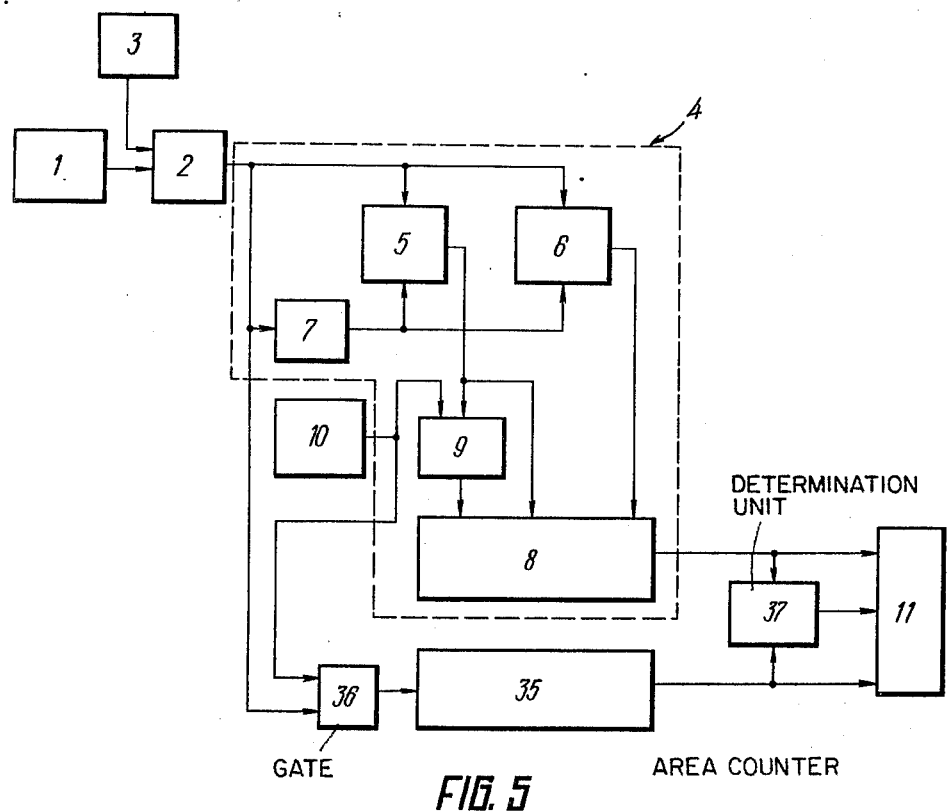
FIG. 5 is a block unit diagram of an alternative embodiment of an apparatus for evaluating characteristics of the image of an object according to the present invention, viz. for evaluating the perimeter, area and form factor.

The operation of the apparatus for evaluating characteristics of the image of an object, illustrated in FIG. 5, is similar to that of the apparatus shown in FIG. 1, described hereinabove.

The difference resides in the incorporation of a unit 37 for determination the form factor of the image of the object, which is a widely known per se computation device effecting computation according to a formula:

$$f = \frac{p^2}{s} \qquad (6)$$

wherein $f$ is the form factor of the image of the object;
$p$ is the perimeter; and
$s$ is the area of the image.

The first input of the form factor determination unit 37 is connected to the output of the perimeter computation unit 8, wherein the value of the perimeter p of the image is computed. The second input of this unit 37 is connected to the area counter 35 determining the area s of the image as a sum total of the duration of the square pulses proportional to the lengths of the chords of the image, quantized by means of the gate 36 with the pulses coming from the generator 10. The area counter is of a known binary counter or else a decimal counter having a sequential pulse count input. The gate 36 is an AND gate.

The signals coming from the outputs of the perimeter computation unit 8, of the area counter 35 and of the form factor determination unit 37 are sent to the input of the registering unit 11.

Figure 6:
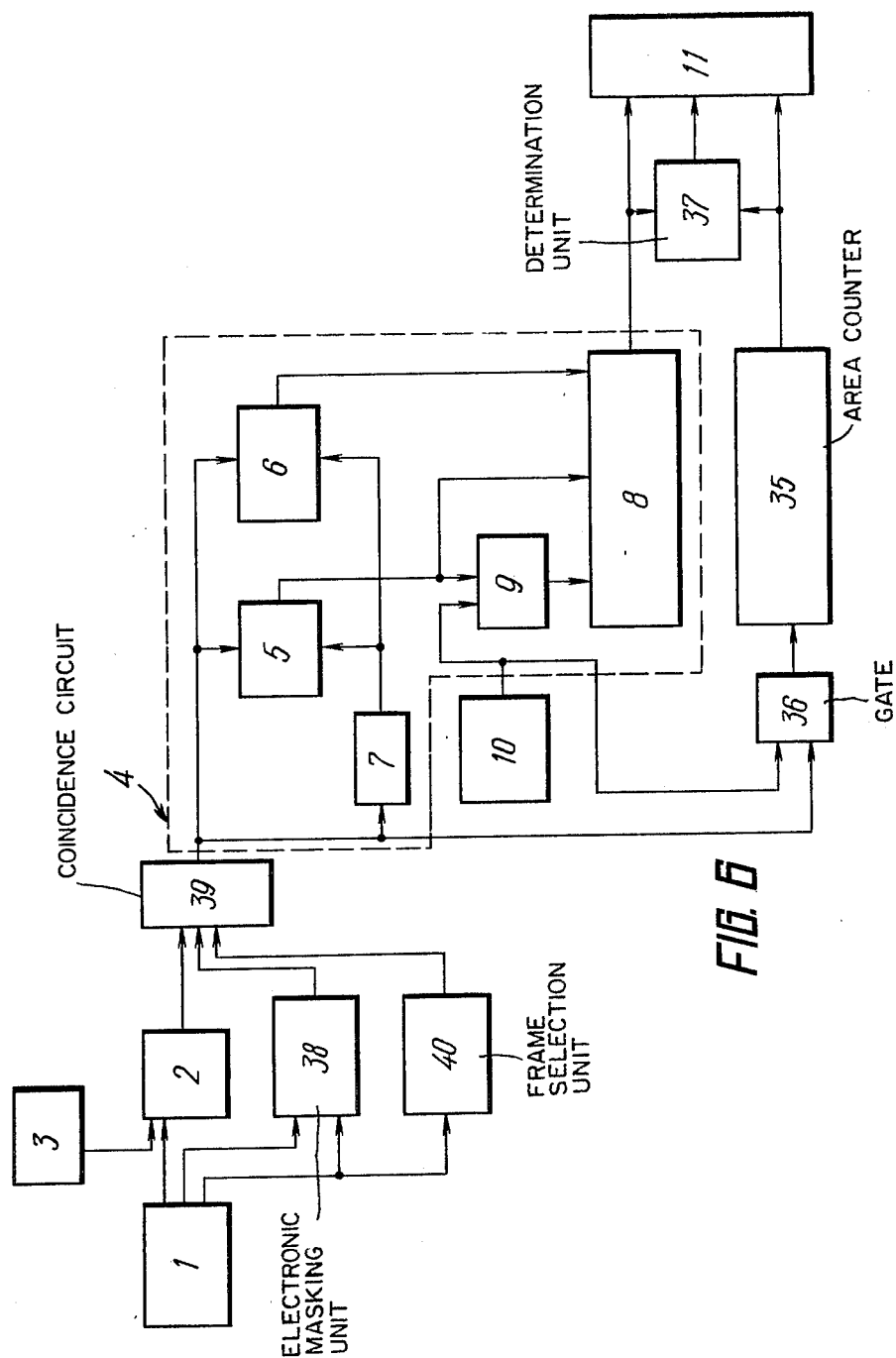
FIG. 6 is a block unit diagram of a modified embodiment of the herein disclosed apparatus for evaluating characteristics of the image of an object, as presented in FIG. 5.

In still another embodiment of the present invention, illustrated in FIG. 6, the apparatus for evaluating characteristics of the image of an object, in accordance with the present invention, additionally incorporates an electronic making unit 38 capable of effecting space- and time-related selection of the image of a specified object against the background of a combination of objects. Units of this kind are commonly known in the art of television and pulse-processing and may be structurally based on commonly known pulse counters, registers, logical elements and decoders. In the television techniques such units are known under the name of aperture signal units or special effect units. In the presently described embodiment the electronic masking unit 38 generates a train of square pulses which are in a fixed relationship with the line and frame timing pulses, their duration and timing, however, adjustable. These square electronic masking pulses are sent as enabling pulses to the coincidence circuit 39, thus limiting in time the passage of the square pulses 44 (FIG. 7), 53 (FIG. 8), etc. proportional to the lengths of the chords of the image of the object, to the synchronous subtraction unit 5 (FIG. 6), to the synchronous coincidence unit 6 and to the delay means 7. The commonly known line-by-line and frame-by-frame scanning system converts the time-related selection of the square pulses 44, 53, etc. proportional to the lengths of the chords of the image, into the space-related selection of the elements of the image of the object.

In accordance with another feature of the present invention, the apparatus for evaluating characteristics of the image of an object may incorporate means enabling to separate the outcome of the evaluation of the characteristics of the image in a single specified TV frame.

In the embodiment being under consideration this is attained by incorporation of a widely known per se frame selection unit 40 (FIG. 6) which may be based on commonly known pulse counters, logical elements, decoders, etc. The frame selection unit 40 generates square pulses timed with the frame master pulses supplied to the input of this unit 40, the duration of these square pulses equalling a single frame scanning duration. These square pulses generated by the frame selection unit 40 are supplied as enabling pulses to one of the inputs of a coincidence circuit 39, wherein they enable the passage of the square pulses 44, 53, etc. proportional to the lengths of the chords of the image of the object through the coincidence circuit 39 only during the specified frame scanning cycle.

In every other respect the operation of the last-described embodiment of the invention is similar to that of the embodiment described hereinabove in connection with FIG. 1.

The herein disclosed apparatus for evaluating characteristics of the image of an object may be employed as an independent instrument for rapid evaluation of the area, perimeter and form factor of an object under investigation. Alternatively, it may be employed as a component of more complicated systems for automatic measurement and evaluation of characteristics of images of objects and for identifications of images and situations.

The herein disclosed apparatus may be highly recommended as an indispensable part of a system of apparatus for automatic classification of cytological preparations into normal and suspected of pointing to various oncologic diseases at early stages.

What we claim is:

1. An apparatus for evaluating characteristics of the image of an object, comprising: scanning means effecting with the help of a scanning raster line-by-line and frame-by-frame scanning of the image of said object with conversion of said image into a video signal; a video signal discriminator connected to said scanning means and adapted to form square pulses proportional to the lengths of the chords of said image of said object; delay means connected to the output of said video signal discriminator, wherein said square pulses coming from said video signal discriminator are delayed for a time necessary for effecting synchronous comparison of said square pulses related to a current and delayed lines of said raster; a synchronous coincidence unit having a first input, a second input and an output, said first input being connected to the output of said video signal discriminator directly and said second input being connected to said output of said video signal discriminator through said delay means, for effecting comparison by the number of coincidences of the fronts of said square pulses related to said current and delayed lines; a synchronous subtraction unit having a first input, a second input and an output, said first input being connected to said output of said video signal discriminator directly and said second input being connected to the same said output through said delay means, for effecting subtraction of the duration of said square pulses proportional to the lengths of said chords of said image of the object in said current and delayed lines; a gate means having a first input, a second input and an output, said first input being connected to said output of said synchronous subtraction unit; a generator of quantizing pulses having its output connected to said second input of said gate means so that the square pulses of which the duration is proportional to the difference between the lengths of the chords in said current and delayed lines of said image of said object, obtained as a result of said subtraction, are filled with quantizing pulses coming from the output of said generator of quantizing pulses to said second input of said gate means; a unit for computation of the perimeter of said image of said object, having a first input, a second input and a third input and a third input and having said first input thereof connected to said output of said gate means, said second input thereof being connected to said output of said synchronous subtraction unit and said third input thereof being connected to said output of said synchronous coincidence unit so that within said perimeter computation unit a sequence of the quantized square pulses proportional to the difference between the lengths of the chords of said image in said current and delayed lines is used for approximation of a part of the perimeter of said image of said object, the value thus obtained having added thereto a quantity of interline spaces of said raster equal to the number of the coincidences of the fronts of said square pulses proportional to the lengths of the chords of said image, detected by said synchronous coincidence unit, in which mannner said perimeter computation unit effects approximation of the full perimeter of said image of said object.

2. An apparatus as claimed in Claim 1, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of quantized square pulses proportional to the differences between the lengths of the chords of said image of said object in said current and delayed lines; a code converter having a first input, a zero setting input, a control input, a first output, a second output, a third output, a fourth output and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trains of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

3. An apparatus as claimed in Claim 1, wherein said synchronous coincidence unit comprises: a first shaper of pulses coinciding with the fronts of said square pulses proportional to the lengths of the chords of said image, having the input thereof connected to said video signal discriminator; a second shaper of pulses coinciding with the fronts of said square pulses proportional to the lengths of the chords of said image, having the inputs thereof connected to said output of said delay means; a first AND gate having a first input, a second input and an output and having said first and second inputs thereof connected, respectively, to the outputs of said first and second pulse shapers; a first NOT gate having the input thereof connected to said video signal discriminator; a second NOT gate having the input thereof connected to said output of said delay means; a third shaper of pulses coinciding with the fronts of said square pulses proportional to the lengths of the chords of said image, having the input thereof connected to the output of said first NOT gate; a fourth shaper of pulses coinciding with the fronts of said square pulses proportional to the lengths of the chords of said image, having the input thereof connected to the output of said second NOT gate; a second AND gate having a first input, a second input and an output, said first and second inputs thereof being connected, respectively, to the outputs of said third and fourth pulse shapers; an OR gate having a first input, a second input and an output and having said first and second inputs thereof connected, respectively, to said outputs of said first and second AND gates, there being formed at said output of said OR gate the pulses of coincidence of the fronts of said square pulses proportional to the lengths of the chords of said image of said object in said current and delayed lines, supplied to the third input of said perimeter computation unit.

4. An apparatus as claimed in claim 3, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of quantized square pulses proportional to the differences between the length of the chords of said image of said object in said current and delayed lines; a code converter having a first input, a zero setting input, a control input, a first output, a second output, a third output, a fourth output, and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trains of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

5. An apparatus as claimed in Claim 1, wherein said synchronous subtraction unit comprises: a first AND gate having a first input, a second input and an output and having said first input thereof connected to said video signal discriminator; a second AND gate having a first input, a second input and an output and having said second input thereof connected to said delay means; a first NOT gate having its input connected to said delay means and having the output thereof connected to said second input of said first AND gate; a second NOT gate having the input thereof connected to said video signal discriminator and having the output thereof connected to said first input of said second AND gate; an OR gate having a first input, a second input and an output, said first and second inputs thereof being connected, respectively, to said outputs of said first and second AND gates, whereby there are formed at said output of said OR gate said square pulses proportional to the differences between the lengths of the chords of said image in said current and delayed lines, said pulses being fed directly to said second input of said perimeter computation unit and being fed to said first input of the same said unit through said gate means.

6. An apparatus as claimed in claim 5, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of quantized square pulses proportional to the differences between the lengths of the chords of said image of said object in said current and delayed lines; a code converter having a first input, a zero setting input, a control input, a first output, a second output, a third output, a fourth output and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trains of quantized square pulses; said scaling means having their respective scaling factor determined in dependence on the scanning standard, on the ratio of the frequency of said generator of quantizing pulses to the line-by-line scanning frequency and on the respective sequential number of the output of said code converter.

7. An apparatus as claimed in claim 5, wherein said synchronous coincidence unit comprises: a first shaper of pulses coinciding with the fronts of said square pulses proportional to the lengths of the chords of said image, having the input thereof connected to said video signal discriminator; a second shaper of pulses coinciding with the fronts of said square pulses proportional to the lengths of the chords of said image, having the input thereof connected to said output of said delay means; a first AND gate having a first input, a second input and an output and having said first and second inputs thereof connected, respectively, to the outputs of said first and second pulse shapers; a first NOT gate having the input thereof connected to said video signal discriminator; a second NOT gate having the input thereof connected to said output of said delay means; a third shaper of pulses coinciding with the fronts of said square pulses proportional to the lengths of the chords of said image, having the input thereof connected to the output of said first NOT gate; a fourth shaper of pulses coinciding with the fronts of said square pulses proportional to the lengths of the chords of said image, having the input thereof connected to the output of said second NOT gate; a second AND gate having a first input, a second input and an output, said first and second inputs thereof being connected, respectively, to the outputs of said third and fourth pulse shapers; an OR gate having a first input, a second input and an output and having said first and second inputs thereof connected, respectively, to said outputs of said first and second AND gates, there being formed at said output of said OR gate the pulses of coincidence of the fronts of said square pulses proportional to the lengths of the chords of said image of said object in said current and delayed lines, supplied to the third input of said perimeter computation unit.

8. An apparatus as claimed in claim 7, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequency of quantized square pulses proportional to the differences between the lengths of the chords of said image of said object in said current and delayed lines; a code converter having a first input, a zero setting input, a control input, a first output, a second output, a third output, a fourth output and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary to the trains of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

9. An apparatus as claimed in claim 1, wherein said delay means includes an ultrasonic delay line adjusted for effecting a delay equal to the duration of the scanning of a single line of said image of said object.

10. An apparatus as claimed in claim 9, wherein said perimeter computation unit adapted for computation of the perimeter of said image of said object comprises, an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of guantized square pulses proportional to the difference between the lengths of the chords of said image of said object in said current and delayed lines; a code converter having a first input, a zero setting input, a control input, a first output, a second output, a third output, a fourth output and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trans of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

11. An apparatus as claimed in claim 9, wherein said synchronous coincidence unit comprises: a first shaper of pulses coinciding with the fronts of said square pulses proportional to the lengths of the chords of said image, having the input thereof connected to said video signal discriminator; a second shaper of pulses coinciding with the fronts of said square pulses proportional to the lengths of the chords of said image, having the input thereof connected to said output of said delay means; a first AND gate having a first input, a second input and an output and having said first and second inputs thereof connected, respectively, to the outputs of said first and second pulse shapers; a first NOT gate having the input thereof connected to said video signal discriminator; a second NOT gate having the input thereof connected to said output of said delay means; a third shaper of pulses coinciding with the fronts of said square pulses proportional to the lengths of the chords of said image, having the input thereof connected to the output of said first NOT gate; a fourth shaper of pulses coinciding with the fronts of said square pulses proportional to the lengths of the chords of said image, having the input thereof connected to the output of said second NOT gate; a second AND gate having a first input, a second input and an output, said first and second inputs thereof being connected, respectively, to the outputs of said third and fourth pulse shapers; an OR gate having a first input, a second input and an output and having said first and second inputs thereof connected, respectively, to said outputs of said first and second AND gates, there being formed at said output of said OR gate the pulses of coincidence of the fronts of said square pulses proportional to the lengths of the chords of said image of said object in said current and delayed lines, supplied to the third input of said perimeter computation unit.

12. An apparatus as claimed in claim 11, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of quantized square pulses proportional to the differences between the lengths of the chords of said image of said object in said current and delayed lines; a code converter having a first input, a zero setting input, a control input, a first output, a second output, a third output, a fourth output, and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input os said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trains of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

13. An apparatus as claimed in claim 9, wherein said synchronous subtraction unit comprises: a first AND gate having a first input, a second input and an output and having said first input thereof connected to said video signal discriminator; a second AND gate having a first input, a second input and an output and having said second input thereof connected to said delay means; a first NOT gate having the input thereof connected to said delay means and having the output thereof connected to said second input of said first AND gate; a second NOT gate having the input thereof connected to said video signal discriminator and having the output thereof connected to said first input of said second AND gate; an OR gate having a first input, a second input and an output and having said first and second inputs thereof connected, respectively, with said outputs of said first and second AND gates, whereby there are formed at said output of said OR gate said square pulses proportional to the differences of the lengths of the chords of said image in said current and delayed lines, said pulses being supplied directly to said second input of said perimeter computation unit and being supplied to said first input of said unit through said gate means.

14. An apparatus as claimed in claim 13, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous sutraction unit through said gate means for supplying a sequence of quantized square pulses proportional to the differences between the lengths of the chords of said image of said object in said current and delayed lines; a code converter having a first input, a zero setting input, a control input, a first output, a second output, a third, a fourth output and an n-th output, said first input thereof being connected to the output of said gate means, through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current end delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trains of quantized square pulses; said scaling means having their respective scaling factor determined in dependence on the scanning standard, on the ratio of the frequency of said generator of quantizing pulses to the line-by-line scanning frequency and on the respective sequential number of the output of said code converter.

15. An apparatus as claimed in claim 13, wherein said synchronous coincidence unit comprises: a first shaper of pulses coinciding with the fronts of said square pulses proportional to the lengths of the chords of said image, having the input thereof connected to said video signal discriminator; a second shaper of pulses coinciding with the fronts of said square pulses proportional to the lengths of the chords of said image, having the input thereof connected to said output of said delay means; a first AND gate having a first input, a second input and an output and having said first and second inputs thereof connected, respectively, to the outputs of said first and second pulse shapers; a first NOT gate having the input thereof connected to said video signal discriminator; a second NOT gate having the input thereof connected to said output of said delay means; a third shaper of pulses coinciding with the fronts of said square pulses proportional to the lengths of the chords of said image, having the input thereof connected to the output of said first NOT gate; a fourth shaper of pulses coinciding with the fronts of said square pulses proportional to the lengths of the chords of said image, having the input thereof connected to the output of said second NOT gate; a second AND gate having a first input, a second input and an output, said first and second inputs thereof being connected, respectively, to the outputs of said third and fourth pulse shapers; an OR gate having a first input, a second input and an output and having said first and second inputs thereof connected, respectively, to said outputs of said first and second AND gates, there being formed at said output of said OR gate the pulses of coincidence of the fronts of said square pulses proportional to the lengths of the chords of said image of said object in said current and delayed lines, supplied to the third input of said perimeter computation unit.

16. An apparatus as claimed in Claim 15, wherein said perimeter computation unit adapted for computation of the perimeter of said image of said object comprises: an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of quantized square pulses proportional to the differences between the lengths of the chords of said image of said object in said current and delayed lines; a code converter having a first input, a zero setting input, a control input, a first output, a second output, a third output, a fourth output and an n-th output, said first input thereof being connected to the output of said gate means, through which are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportional to the differences between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of said code converter and having the output thereof connected to said n-th input of said adder for supplying thereto complementary pulses to the trains of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

17. An apparatus for evaluating characteristics of the image of an object, comprising: scanning means effecting with the help of a raster line-by-line and frame-by-frame scanning of said image of said object and converting it into a video signal; a video signal discriminator connected to said scanning means and forming square pulses proportional to the lengths of the chords of said image; a delay means electrically connected with the ouput of said video signal discriminator, wherein said square pulses coming from said video signal discriminator are delayed for a time necessary for effecting synchronous comparison of said square pulses representing a current line and a delayed line of said raster; a synchronous coincidence unit having a first input, a second input and an output, having said first input thereof electrically connected with said output of said video signal discriminator and having said second input thereof connected with said output of said video signal discriminator through said delay means, for effecting a comparison by the number of coincidences of the fronts of said square pulses representing said current and delayed lines; a synchronous subtraction unit having a first input, a second input and output, said first input thereof being electrically connected with said output of said video signal discriminator, said second input thereof being electrically connected with said output of said video signal discriminator through said delay means, for effecting subtraction by the duration of said square pulses proportional to the lengths of the chords of said image in said current and delayed lines; a first gate means having a first input, a second input and an output, said first input being connected to said output of said synchronous subtraction unit; a generator of quantizing pulses having the output thereof connected to said second input of said first gate means, so that the square pulses having proportional duration proportionall to the differences between the lengths of the chords in said current and delayed lines of said image, produced as a result of the subtraction, are filled with quantizing pulses coming from said output of said generator of quantizing pulses to said second input of said first gate means; a unit for computation of the perimeter of said image of said object, having a first input, a second input and a third input, said first being connected to said output of said first gate means, said second input being connected to said output of said synchronous subtraction unit and said third input being connected to said output of said synchronous coincidence unit, so that within said perimeter computation unit the trains of the quantized square pulses proportional to the differences between the lengths of the chords of said image in said current and delayed lines are processed for approximation of a part of the perimeter of said image of said object, there being added to the value thus obtained a number of inter-line spaces equal to the number of the coincidences of the fronts of said square pulses proportional to the lengths of the chords of said image, determined by said synchronous coincidence unit, in which way the full perimeter of said image of said object is approximated; a second gate means having a first input, a second input and an output, said first input being electrically connected with said output of said video signal discriminator, said second input being connected to said output of said generator of quantizing pulses; an area counter having the input thereof connected with said output of said second gate means, wherein the sum total of the duration of said square pulses proportional to the lengths of the chords of said image is determined to represent the area of said object; a form factor determination unit having a first input and a second input, said inputs being connected, respectively, to said output of said perimeter computation unit and to the output of said area counter, so that there is effected within said form factor determination unit division of the squared value of the perimeter by said sum total of the duration of said square pulses, representing the area of said image of said object.

18. An apparatus as claimed in claim 17, wherein said delay means includes an ultrasonic delay line having the time of delay equal to the duration of the scanning of a single line of said image of said object.

19. An apparatus as claimed in claim 17, wherein said synchronous subtraction unit comprises: a first AND gate having a first input, a second input and an output and having said first input thereof connected to said video signal discriminator; a second AND gate having a first input, a second input and an output and having said second input thereof connected to said delay means; a first NOT gate having the input thereof connected to said delay means and having the output thereof connected to said second input of said first AND gate; a second NOT gate having the input thereof connected to said video signal discriminator and having the output thereof connected to said first input of said second AND gate; an OR gate having a first input, a second input and an output and having said inputs thereof connected to the respective outputs of said first and second AND gates, whereby there are formed at said output of said OR gate said square pulses proportional to the differences between the lengths of the chords of said image in said current and delayed lines, said pulses being fed directly to said second input of said perimeter computation unit and being fed to the first input of said unit through said first gate means.

20. An apparatus as claimed in claim 17, wherein said synchronous coincidence unit comprises: a first shaper of pulses coinciding with the fronts of said square pulses proportional to the lengths of the chords of said image, having the input thereof connected to said video signal discriminator; a second shaper of pulses coinciding with the fronts of said square pulses proportional to the lengths of the chords of said image, having the input thereof connected to said output of said delay means; a first AND gate having a first input, a second input and output and having said first and second inputs thereof connected, repectively, to the outputs of said first and second pulse shapers, a first NOT gate having the input thereof connected to said video signal discriminator; a second NOT gate having the input thereof connected to said output of said delay means; a third shaper of pulses coinciding with the fronts of said square pulses proportional to the lengths of the chords of said image, having the input thereof connected to the output of said first NOT gate; a fourth shaper of pulses coinciding with the fronts of said square pulses proportional to the lengths of the chords of said image, having the input thereof connected to the output of said second NOT gate; a second AND gate having a first input, a second input and an output, said first and second inputs thereof being connected, respectively, to the outputs of said third and fourth pulse shapers; an OR gate having a first input, a second input and an output and having said first and second inputs thereof connected, respectively, to said outputs of said first and second AND gates, there being formed at said output of said OR gate the pulses of coincidence of the fronts of said square pulses proportional to the lengths of the chords of said image in said current and delayed lines, supplied to the third input of said perimeter computation unit.

21. An apparatus as claimed in claim 17, wherein said perimeter computation unit adapted for computation of the perimeter of said image of said object comprises, an adder having a first input, a second input, a third input, a fourth input, a fifth input, a sixth input and an n-th input, said first input thereof being connected to said output of said synchronous coincidence unit for supplying coincidence pulses, said second input thereof being connected to said synchronous subtraction unit through said gate means for supplying a sequence of quantized square pulses proportional to the differences between the lengths of the chords of said image of said object in said current and delayed lines; a code converter having a first input, a zero setting input, a control input, a first output, a second output, a third output, a fourth output and an n-th output, said first input thereof being connected to the output of said gate means through which there are supplied trains of quantized square pulses represented in a sequential code; a first selector of the fronts of said square pulses proportional to the differences between the lengths of the chords of said image in said current and delayed lines, having the input thereof connected to said output of said synchronous subtraction unit and having the output thereof connected to said zero setting input of said code converter; a NOT gate having the input thereof connected to said output of said synchronous subtraction unit; a second selector of the fronts of said square pulses proportion to the difference between the lengths of the chords of said image in said current and delayed lines, having the input thereof connected to said synchronous subtraction unit through said NOT gate and having the output thereof connected to said control input of said code converter; a first scaling means having the input thereof connected to said first output of said code converter and having the output thereof connected to said third input of said adder for supplying thereto complementary pulses to the trains of quantized square pulses; a second scaling means having the input thereof connected to said second output of said code converter and having the output thereof connected to said fourth input of said adder for supplying thereto complementary pulses to the trains of quantized square pulses; a third scaling means having the input thereof connected to said third output of said code converter and having the output thereof connected to said fifth input of said adder for supplying thereto complementary pulses to the trains of quantized square pulses; a fourth scaling means having the input thereof connected to said fourth output of said code converter and having the output thereof connected to said sixth input of said adder for supplying thereto complementary pulses to the trains of quantized square pulses; an n-th scaling means having the input thereof connected to said n-th output of a said code converter and having the output thereof connected to said n-th input of said added for supplying thereto complementary pulses to the trains of quantized square pulses; said scaling means having their respective scaling factors determined in dependence on the scanning standard, on the ratio of the frequency of said generator of quantizing pulses to the line-by-line scanning frequency and on the respective sequential number of the output of said code converter.

22. An apparatus as claimed in claim 17, comprising: an electronic masking unit having frame-oriented and line-oriented synchronization inputs and output, said inputs being connected to said scanning means, a coincidence circuit having a first input, a second input and an output, said first and second inputs being connected, respectively, to said video signal discriminator and to said output of said electronic masking unit, said output of said coincidence circuit being connected to the input of said delay means, to said first input of said synchronous subtraction unit, to said first input of said synchronous coincidence unit and to said second input of said first gate means.

23. An apparatus as claimed in claim 22, wherein said coincidence circuit additionally has a third input, said apparatus further comprising a frame selection unit having the input thereof connected to said scanning means and having the output thereof connected to said third input of said coincidence circuit.

* * * * *